United States Patent

[11] 3,544,086

[72] Inventor Howard P. Willett
  Darien, Connecticut
[21] Appl. No. 753,583
[22] Filed Aug. 19, 1968
[45] Patented Dec. 1, 1970
[73] Assignee Chemical Construction Corporation
  New York, New York
  a corporation of Delaware

[54] ADJUSTABLE ANNULAR VENTURI SCRUBBER
  29 Claims, 5 Drawing Figs.
[52] U.S. Cl. .................................................. 261/62,
  55/241, 261/109, 261/116, 261/118
[51] Int. Cl. ...................................................... B01d 47/00
[50] Field of Search.......................................... 261/62,
  108—112, 116, 118; 55/226, 241, 257

[56] References Cited
UNITED STATES PATENTS
3,432,153 3/1969 Drum .......................... 261/108

Primary Examiner—Frank W. Lutter
Assistant Examiner—Steven H. Markowitz
Attorney—J. L. Chaboty ABSTRACT: Apparatus is provided for scrubbing contaminants from a gas stream, which includes an annular venturi scrubber in which the throat section is adjustable by means of a vertically movable central conical baffle. A central pipe is disposed above the apex of the conical baffle, to pass scrubbing liquid downwards on the outer surface of the conical baffle. Liquid is also passed downwardly on the inner surface of an inverted frustoconical baffle which is concentrically disposed external to the conical baffle. The conical baffle is preferably vertically displaced by means of a dependent central support shaft which extends downward from the apex of the conical baffle to external support and vertical displacement elements. A central rod preferably extends vertically upwards from the apex of the conical baffle into the central liquid supply pipe, and the rod is preferably provided with external alinement fins.

Patented Dec. 1, 1970

HOWARD P. WILLETT
INVENTOR.

BY
AGENT

HOWARD P. WILLETT
INVENTOR.

HOWARD P. WILLETT
INVENTOR.

ADJUSTABLE ANNULAR VENTURI SCRUBBER

BACKGROUND OF THE INVENTION

1. Field of the Invention

The invention relates to an improved apparatus for the scrubbing of a gas stream to remove entrained solid particles and other contaminants such as mist, vapors or noxious gaseous components. Numerous industrial or commercial facilities generate and discharge hot gas streams to the atmosphere. These streams may be laden with entrained solids, mists and vapors, which must be removed prior to atmospheric discharge in order to prevent atmospheric pollution or to recover valuable components. Among such facilities may be mentioned incinerators, iron cupola furnaces, steam-electric power plants, oxygen steel converters, sulfide ore roasters, and black liquor furnaces in wood pulp processing facilities. The entrained solids in the hot discharge gas stream may consist of soot, fly ash, iron oxide particles or various types of dust. In many instances, particularly in older existing facilities, the gas stream is directly discharged to the atmosphere through a stack, which serves to disperse the entrained solids, sparks or mist and vapors into the upper atmosphere and thus prevents localized fallout of these contaminants in the surrounding area. In recent years, however, more stringent air pollution regulations have been enacted in many communities, which have necessitated the provision of adequate facilities or apparatus for treating the stack gases so as to remove entrained contaminants and prevent air pollution. In many instances, the installation of conventional devices such as bag filters is not warranted due to the cost of such facilities, and the prior art devices generally fail to compensate for variations in gas flow rate, such as is encountered in periodic, cyclic, or batch-type processes which generate or discharge gas streams at varying or intermittent flow rate.

2. Description of the Prior Art

Numerous devices have been provided in the prior art for the wet scrubbing of gas streams to remove entrained solid particles. Among the devices which provide a venturi passage or venturilike scrubbing effect may be mentioned those of U.S. Pat. Nos. 3,317,197; 3,262,685; 3,085,793 and 3,116,348. Other devices and apparatus assemblages are disclosed in U.S. Pat. No. 3,077,714 and Canadian Pat. Nos. 684,884 and 670,150. Other art relative to gas washing or dispersion of a liquid into a gas includes U.S. Pat. Nos. 2,033,404; 2,575,359; 2,086,671; 3,323,290; 2,661,195; 2,354,678; 2,409,088; 3,045,990 and 2,414,718.

SUMMARY OF THE INVENTION

In the present invention, a gas-scrubbing apparatus for removing contaminants such as entrained solid particles, mist, vapors, noxious gaseous components or the like, from a gas stream has been developed, in which an annular throat venturi scrubber is provided, in which the annular throat is adjustable in dimension, which permits an alteration in venturi dimension to accommodate for variations in gas flow rate or to permit greater pressure drop and more effective scrubbing action at substantially constant gas flow rate. The venturi passage is defined by a central conical baffle which is oriented with its apex extending upwards and opposed to gas flow, and an inverted truncated or frustoconical baffle which is concentrically disposed external to the conical baffle and spaced away from the conical baffle, to provide a vertical annular venturi passage between the baffles. Scrubbing liquid is passed downwards on the outer surface of the conical baffle and the inner surface of the inverted frustoconical baffle, and the scrubbing liquid streams are projected into the gas stream at or adjacent to the throat of the venturi passage, to provide an effective scrubbing action by dispersion of the liquid phase into the gas stream as small discrete droplets in accordance with the venturi scrubbing technique. In accordance with the present invention, the central conical baffle is mounted on support means such as a central shaft which depends downwards from the apex of the conical baffle. The shaft or other support means is vertically movable or adjustable, so that the vertical elevation of the conical baffle may be suitably modified relative to the inverted frustoconical baffle, to compensate for variation in gas flow or for other reasons discussed supra. Alteration of the conical baffle elevation serves to modify the venturi configuration, principally by adjusting the throat area, to provide desired scrubbing action under varying operation conditions.

The principal advantage of the present invention is that an annular throat venturi scrubber is provided which may be modified or adjusted to compensate for variations in gas flow rate, while continuously providing effective gas-scrubbing and a desired gas pressure drop through the venturi scrubber. Another advantage is that the annular throat venturi scrubber provides effective scrubbing of gases at high volumetric flow rates, with relatively low gas pressure drop. A further advantage is that the gas pressure drop and relative gas scrubbing effectiveness may be modified at substantially constant gas flow rate, to compensate for changes in gas composition or concentration of contaminants, such as when the contaminated gas stream is derived from a cyclic, periodic or batch process.

It is an object of the present invention to provide an improved apparatus for scrubbing a gas stream with a liquid scrubbing medium, in order to remove contaminants from the gas stream.

Another object is to provide an improved venturi scrubber for scrubbing gas streams.

A further object is to provide an improved annular venturi scrubber with an adjustable throat, for scrubbing gas streams.

An additional object is to provide an adjustable annular venturi scrubber, which may be adjusted or modified to compensate for variations in gas flow rate or to produce a desired degree of gas scrubbing effectiveness.

These and other objects and advantages of the present invention will become evident from the description which follows.

DESCRIPTION OF THE DRAWINGS AND PREFERRED EMBODIMENTS

Referring now to the drawings, FIG. 1 is a sectional elevation view of a preferred embodiment of the apparatus of the present invention, as applied to the scrubbing of a hot contaminated gas stream, FIG. 2 is a plan view of FIG. 1, taken on section 2-2.

Figure 1:
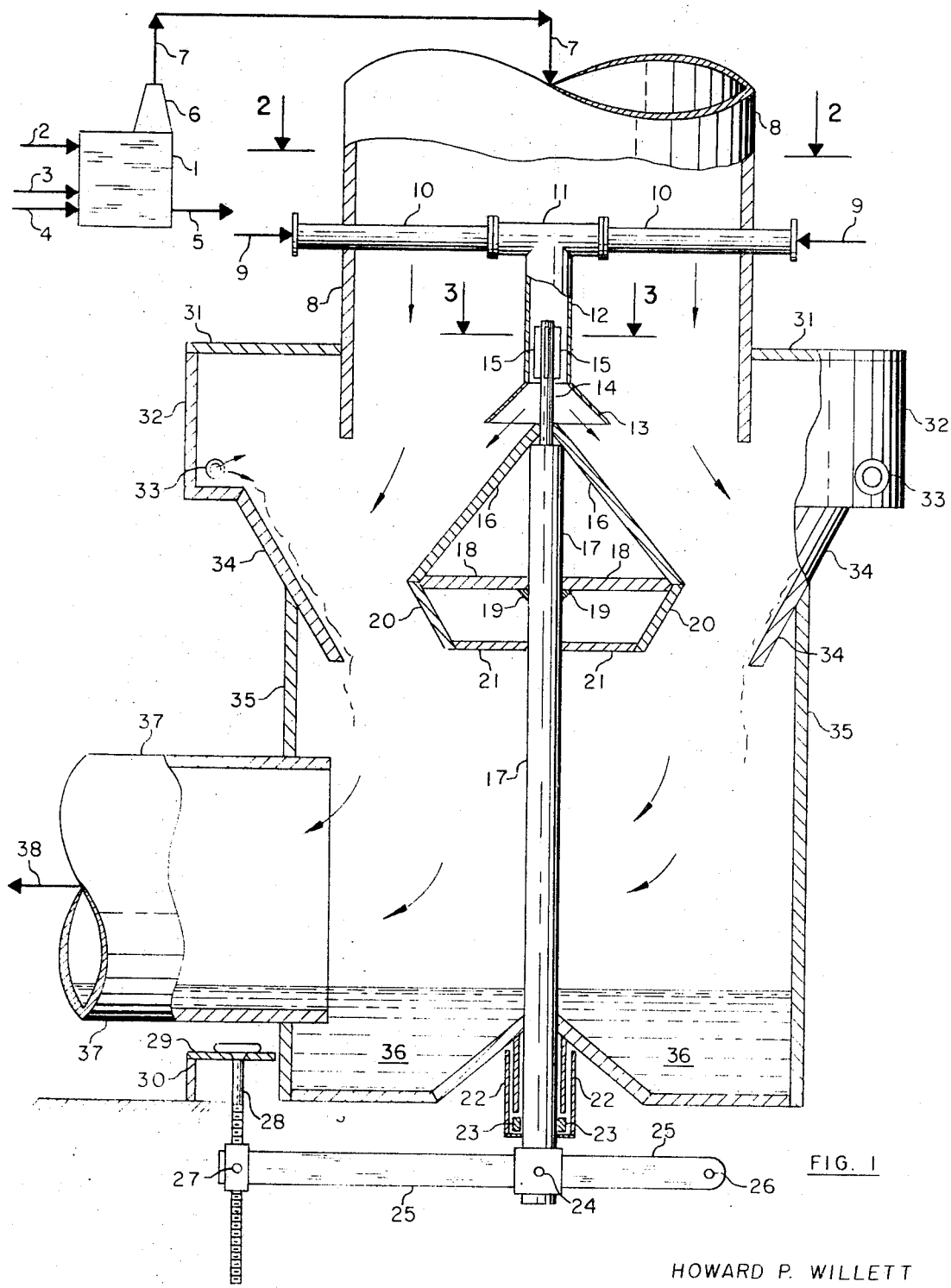

Referring now to FIG. 1, unit 1 is a facility, process or apparatus which serves to generate a contaminant-containing gas stream. In this embodiment of the invention, unit 1 is an incinerator for the burning of solid waste material such as garbage. Solid waste material stream 2 is passed into incinerator 1, and is burned on a suitable movable grate or the like within unit 1, by the passage of air stream 3 and a suitable fuel stream 4 into the lower portion of unit 1. Stream 4 may consist of a fluid hydrocarbon fuel such as natural gas or fuel oil and in some types of incinerator operation stream 4 may be omitted, such as when stream 2 is of a suitable composition to support combustion. Residual solid ashes, metal or metallic particles, glass etc., are removed from unit 1 via stream 5, and the gas stream generated within unit 1 by the incineration of stream 2 is removed via outlet 6 as stream 7, which is a hot gaseous stream containing entrained solid particles such as fly ash, fume or smoke, and noxious gaseous components such as sulfur dioxide. Section 6 may contain suitable heat recovery appurtenances, such as an internal steam generation coil or tubes.

Stream 7 is now processed and scrubbed in accordance with the present invention, to remove contaminants prior to discharge of the scrubbed gas stream to atmosphere. Stream 7 is passed downwards through the vertically oriented cylindrical conduit 8, which conducts the gas stream into the adjustable annular venturi scrubber of the present invention. Suitable scrubbing liquid streams 9 are passed into inlet ducts 10, which extend radially inwards through the wall of conduit 8. Streams 9 may consist of water, an aqueous scrubbing liquid solution, recirculated scrubbing liquor from prior scrubbing which may be filtered or otherwise clarified or chemically treated, or any other suitable liquid scrubbing medium. The ducts 10 conduct stream 9 to coupling duct 11, from which the vertically oriented duct or pipe 12 depends centrally downwards to conduct streams 9 into the venturi scrubber.

The vertical pipe 12 is centrally and coaxially alined with conduit 8, and pipe 12 is preferably provided with a lower outwardly flaring skirt 13 to prevent splashing of the scrubbing liquid. A substantially vertical guide rod 14 is preferably provided, and rod 14 extends coaxially upwards into pipe 12 from the apex of the conical baffle to be described infra. The rod 14 is spaced within vertical pipe 12 to provide an annular passage for downwards liquid flow between rod 14 and pipe 12, and rod 14 is preferable spaced by providing at least one external fin 15 which is attached to rod 14 and extends outwards in the annular space between rod 14 and pipe 12. The fin 15 is preferably linear and vertically attached to the rod 14, however, as will appear infra the fin 15 may alternatively be spirally attached to the rod 14 and a plurality of fins may be provided in practice.

The skirt 13 is coaxially disposed above the conical baffle 16, which is vertically and coaxially oriented at the lower outlet of conduit 8, with the apex of baffle 16 extending upwards and opposed to downwards gas flow from conduit 8. The scrubbing liquid stream which is discharged downwards from pipe 12 at the apex of conical baffle 16 passes downwards on the outer surface of baffle 16 as a liquid film or layer, which is projected outwards and into the gas stream adjacent to the lower end of baffle 16, at which point the gas stream has been accelerated to high velocity, as will appear infra.

The conical baffle 16 is mounted on suitable vertically adjustable support means at the lower outlet of conduit 8 and is coaxially alined with conduit 8. In this embodiment of the invention, a central vertical support means is provided for baffle 16, which includes central shaft 17, which depends vertically downwards from the apex of baffle 16. A circular horizontal support plate 18 is preferably provided to further support baffle 16 on shaft 17, and plate 18 preferably extends between shaft 17 and the lower end of baffle 16. Suitable welding 19 is provided between shaft 17 and plate 18 for rigid permanent attachment between these elements, and it will be understood that further welding, not shown, is provided as required between the attached elements in the apparatus of the present invention. An inverted frustoconical baffle 20 which depends downwards from the lower end of conical baffle 16 is preferably provided in this embodiment of the invention, to produce more uniform fluid flow as will appear infra. a circular horizontal plate 21 extends between the lower end of baffle 20 and shaft 17 to provide greater structural strength and rigidity to the baffle combination.

Suitable means are provided to vertically displace shaft 17 and the baffles 16 and 20 either upwards or downwards as required by operating conditions as discussed supra. In this embodiment of the invention, shaft 17 extends downwards through a suitable stuffing box 22 provided with a suitable gasket 23, to permit vertical movement of shaft 17 while preventing fluid leakage. Shaft 17 is mounted on a suitable lower pivot coupling support 24, which connects shaft 17 to the bar or beam 25, which in turn pivots about the fixed pivot element or pin 26. The opposed end of bar 25 is attached to screwed pivot coupling 27, which is displaced by rotation of the threaded adjusting shaft 28, which is provided with a suitable handwheel for manual rotation of shaft 28, which in turn elevates or lowers pivot coupling 27, to displace bar 25 about pivot 26 and thereby vertically elevate or lower shaft 17 and its associated baffles 16 and 20. The upper end of shaft 28 and the associated handwheel are mounted on horizontal support frame 29, which in turn is rigidly mounted on vertical support 30.

Returning now to conduit 8, horizontal circular plate 31 extends outwards from attachment above the lower end of the conduit 8. A shelf 32 depends downwards from the outer edge of plate 31, and a plurality of spaced apart nozzles 33 are alined in tandem on the shelf 32, so that scrubbing liquid, which may be comparable in composition to streams 9, is discharged from nozzles 33 onto shelf 32. An inverted frustoconical baffle 34 depends downwards and inwards from the inner edge of shelf 32. The baffle 34 is concentrically disposed about the conical baffle 16, so that the baffles 16 and 34 serve to define an annular venturi gas flow passage. The baffle 34 may terminate with a lower edge at the same vertical elevation as the lower edge of baffle 16, however in most instances baffle 34 will extend further downwards parallel to the coaxial baffle 20. The relative positions of the baffles in a particular instance will depend upon the vertical adjustment of shaft 17 and the associated baffle elements 16 and 20.

The scrubbing liquid discharged by nozzles 33 flows in a circular direction over the inner edge of shelf 32 and onto the inner surface of baffle 34, thereafter flowing downwards on the inner surface of baffle 34. The gas stream discharged downwards from conduit 8 is accelerated to a high velocity while flowing downwards through the annular venturi passage defined between baffles 16 and 34, and the scrubbing liquid flowing downwards on the opposed surfaces of baffles 16 and 34 is projected into the highly accelerated gas stream at the lower end of the respective baffle, with resultant dispersion of the liquid into the gas stream in the form of small discrete particles and effective scrubbing of the gas stream by the liquid particles, with resultant transfer of contaminants from the gas stream into the liquid phase.

The mixture of scrubbed gas phase and liquid droplets containing contaminants is discharged downwards from the annular venturi scrubbing passage into the lower liquid retention container 35, which extends downwards from baffle 34 and is provided with a bottom recess 36 for liquid retention which aids in separation of scrubbing liquid from the scrubbed gas stream. The liquid may be directly removed from section 36, however excess liquid is preferably removed from container 35 in the bottom of gas removal conduit 37, which passes the scrubbed gas stream 38 and associated liquid to means for gas-liquid separation, not shown. The scrubbed and cleansed gas stream is now discharged to atmosphere, while the scrubbing liquid may be suitably treated by filtration or chemical treatment to produce a liquid suitable for recycle via streams 9 and nozzles 33. In some cases, when water is employed as the scrubbing liquid, a portion or all of the aqueous solution removed via the bottom of conduit 37 may be passed to a sewer or other suitable disposal, with makeup water being added as required.

In practice of the present invention, variations in the flow rate of stream 7, or the content or composition of contaminants in stream 7, or both, will occur during operation of the scrubbing device. In this case, threaded shaft 28 is rotated so as to vertically displace shaft 27, thereby modifying the venturi configuration and scrubbing action by displacement of baffle 16 relative to baffle 34.

Figure 2:
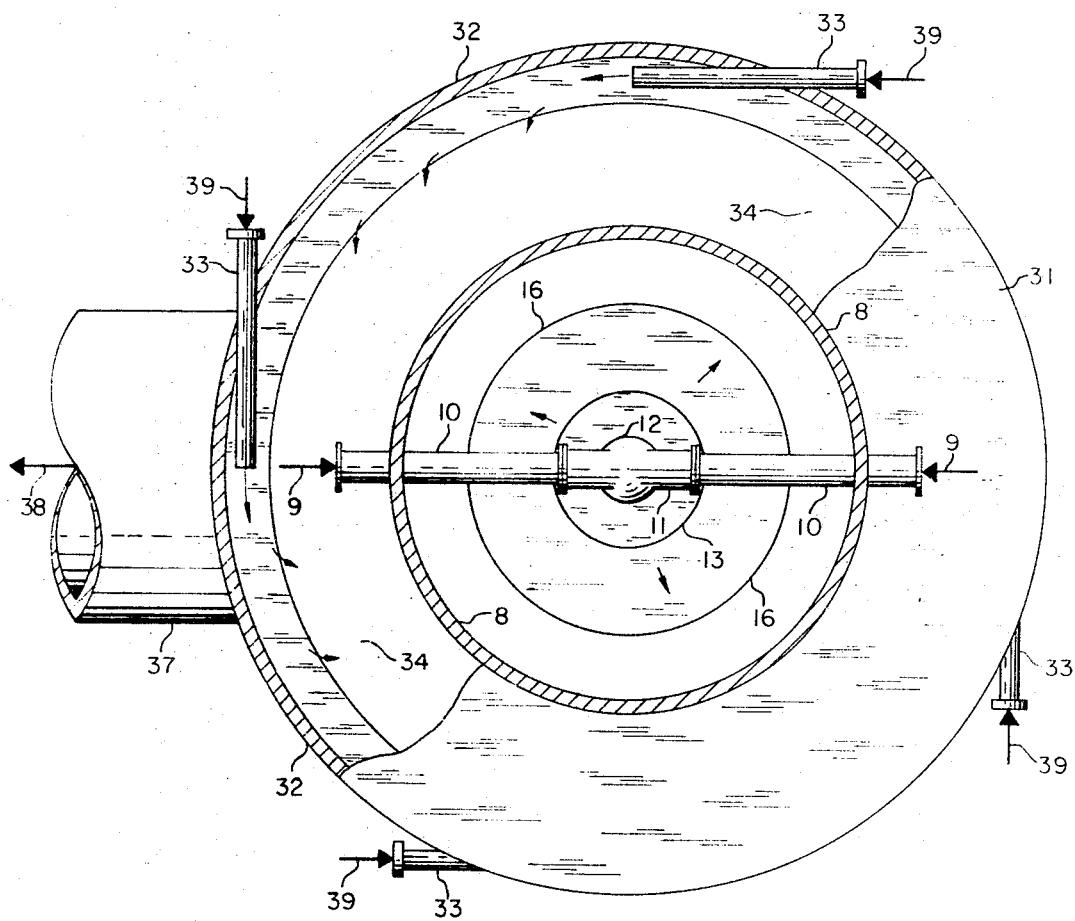

Referring now to FIG. 2, the concentric coaxial arrangement of the several apparatus elements is evident in plan view. Scrubbing liquid streams 39 are shown passing via nozzles 33 onto shelf 32.

Figure 3:
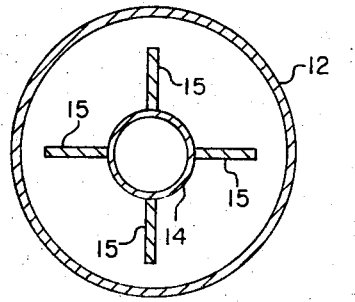
FIG. 3 is a plan view of FIG. 1, taken on section 3-3.
Figure 4:
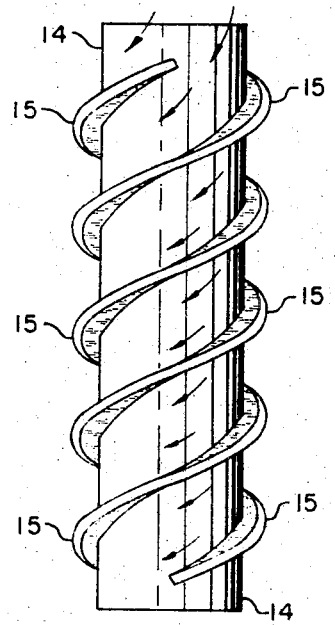
FIGS. 4 and 5 illustrate alternative embodiments of the guide rod and fins assemblage of the present invention.
Figure 5:
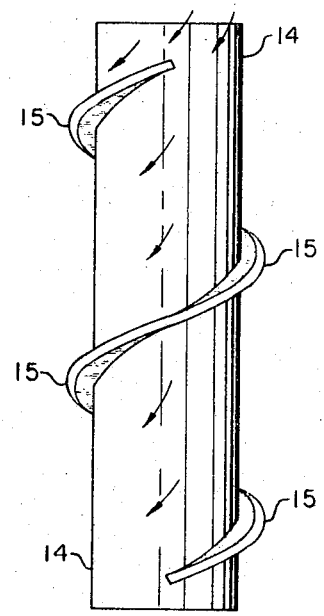

FIG. 3 illustrates the preferred alinement of fins 15 on rod 14 as external vertical linear fins, which serve to aline rod 14 within pipe 12 and guide rod 14 and baffle 16 during vertical displacement of the central assemblage. FIG. 4 illustrates an alternative embodiment of the fins 15, in which a plurality of fins 15 are spirally disposed on the outer surface of rod 14, to provide a whirling flow of scrubbing liquid onto the outer surface of baffle 16. In some instances, as shown in FIG. 5, a single spiral fin 15 may be disposed on the outer surface of rod 14, to provide alinement of rod 14 within pipe 12 and maintain centralized alinement of the apparatus, while also providing a whirling circular motion to the liquid discharged from pipe 12 onto baffle 16.

Numerous alternatives within the scope of the present invention, besides those mentioned supra, will occur to those skilled in the art. Various elements of the apparatus assemblage may be omitted in some instances, or replaced by functionally equivalent apparatus elements of a different structural configuration. The flare skirt 13 may be omitted in suitable instances, or replaced by a series of radial pipes or nozzles. Rod 14 and fins 15 are preferred for centralized alinement of the apparatus and central baffle 16, however in some cases alternative rigid vertically adjustable support for baffle 16 may be provided in practice, in which case rod 14 and fins 15 may be omitted. Similar considerations apply to shaft 17, plates 18 and 21, and baffle 20. Other means for vertical adjustment of shaft 17 besides elements 25 and 28 and their appurtenances may be provided in practice. Shelf 32 may be omitted in some cases, in which event the nozzles 33 would be alined to directly discharge scrubbing liquid such as water or an aqueous solution or slurry onto the inner surface of baffle 34, either tangentially in tandem or at an angle so as to impart a whirling motion to the downflowing liquid. In some cases the nozzles 33 may be radially alined to direct the scrubbing liquid streams 39 downwards in parallel linear paths on the inner surface of baffle 34. In some cases, the scrubbed gas stream 38 may be passed to an indirect gas-to-gas heat exchanger, for heat exchange with the hot gas stream 7, prior to discharge of the reheated scrubbed gas stream to atmosphere via a stack or blower.

I claim:

1. An apparatus for scrubbing contaminants from a gas stream which comprises a vertically oriented cylindrical conduit having an upper inlet and a lower outlet, means in fluid communication with said upper inlet to pass a contaminated gas stream downwards through said conduit, a conical baffle, said conical baffle being mounted on support means at the lower outlet of said conduit and coaxially alined with said conduit, with the apex of said conical baffle extending upwards and opposed to gas flow, means to pass a first scrubbing liquid stream downwards on the outer surface of said conical baffle, whereby said first scrubbing liquid stream is projected outwards and into said gas stream adjacent to the lower end of said conical baffle, an inverted frustoconical baffle, said inverted frustoconical baffle being concentrically disposed external to said conical baffle and spaced away from said conical baffle, whereby a downwardly converging annular venturi gas passage is defined between said inverted frustoconical baffle and said conical baffle, said inverted frustoconical baffle having a lower edge terminating adjacent to the lower end of said conical baffle, fluid closure means extending between the upper end of said inverted frustoconical baffle and said conduit, nozzle means to pass a second scrubbing liquid stream downwards on the inner surface of said inverted frustoconical baffle, whereby said second scrubbing liquid stream is projected inwards and into said gas stream adjacent to the lower end of said conical baffle, means for adjusting said conical baffle support means vertically relative to said inverted frustoconical baffle, and means to separate the gas-liquid mixture discharged below said inverted frustoconical baffle into a scrubbed gas stream and a liquid stream containing contaminants derived from said gas stream.

2. The apparatus of claim 1, combined with a second inverted frustoconical baffle, said second inverted frustoconical baffle depending downwards from the lower end of said conical baffle.

3. The apparatus of claim 2, in which said second inverted frustoconical baffle is parallel with the lower portion of the inverted frustoconical baffle which is concentrically disposed external to and spaced away from said conical baffle.

4. The apparatus of claim 1, in which said means to pass a first scrubbing liquid stream downwards on the outer surface of said conical baffle is disposed at the apex of said conical baffle.

5. The apparatus of claim 4, in which said means to pass a first scrubbing liquid stream downwards on the outer surface of said conical baffle is a vertical pipe disposed above said conical baffle, said vertical pipe being coaxially alined with said conical baffle and terminating adjacent to the apex of said conical baffle, together with means to pass said first scrubbing liquid stream downwards through said vertical pipe, whereby said first scrubbing liquid stream is discharged from the lower end of said vertical pipe onto the apex of said conical baffle.

6. The apparatus of claim 5, combined with a substantially vertical rod, said rod being attached to the apex of said conical baffle and extending coaxially upwards into said rod being spaced within said vertical pipe to provide an annular passage for downwards liquid flow between said rod and said vertical pipe.

7. The apparatus of claim 6, in which said vertical rod is provided with at least one external fin, said fin extending outwards in the annular space between said vertical rod and said vertical pipe.

8. The apparatus of claim 7, in which said fin is vertically attached to said rod.

9. The apparatus of claim 7, in which said fin is spirally attached to said rod.

10. The apparatus of claim 1, in which said means to pass a second scrubbing liquid stream downwards on the inner surface of said inverted frustoconical baffle comprises at least one liquid outlet nozzle, said nozzle being alined substantially tangential to the inner surface of said inverted frustoconical baffle, together with means to pass said second scrubbing liquid stream to said nozzle.

11. The apparatus of claim 10, in which said nozzle is substantially horizontal.

12. The apparatus of claim 10, in which a plurality of nozzles are provided, said nozzles being spaces apart and alined in tandem on a circular shelf, said shelf being mounted about the upper end of said inverted frustoconical baffle, whereby portions of said second scrubbing liquid stream are discharged from said nozzles onto said shelf and said second scrubbing liquid stream flows in a circular direction over the inner edge of said shelf and onto the inner surface of said inverted frustoconical baffle.

13. The apparatus of claim 1, in which said support means on which said conical baffle is mounted is a vertical shaft, said shaft being coaxial with said conical baffle and depending downwards from the apex of said conical baffle to lower means for support and vertical displacement of said shaft and conical baffle, together with a circular horizontal support plate, said plate extending outwards from said shaft to said conical baffle below the apex of said conical baffle.

14. The apparatus of claim 13, in which said circular horizontal support plate extends outwards from said shaft to the lower end of said conical baffle.

15. The apparatus of claim 1, combined with a lower liquid retention container, said container extending downwards from said inverted frustoconical baffle and being provided with a bottom recess for liquid retention, together with means to remove scrubbed gas and excess contaminant-containing scrubbing liquid from said container.

16. The apparatus of claim 1, in which the lower end of said inverted frustoconical baffle is at a lower elevation than the lower end of said conical baffle.

17. An apparatus for scrubbing contaminants from a gas stream which comprises a vertically oriented cylindrical conduit having an upper inlet and a lower outlet, means in fluid communication with said upper inlet to pass a contaminated gas stream downwards through said conduit, a conical baffle, said conical baffle being disposed at the lower outlet of said conduit and coaxially alined with said conduit, with the apex of said conical baffle extending upwards and opposed to gas flow, an adjustable vertical shaft, said shaft being coaxial with said conical baffle and depending downwards from the apex of said conical baffle to lower means for support and vertical displacement of said shaft and conical baffle, a vertical pipe disposed above said conical baffle, said vertical pipe being coaxially alined with said conical baffle and terminating adjacent to the apex of said conical baffle, a substantially vertical rod, said rod being attached to the apex of said conical baffle and extending coaxially upwards into said vertical pipe, said rod being spaced within said vertical pipe to provide an annular passage for downwards fluid flow between said rod and said vertical pipe, means to pass a first scrubbing liquid stream downwards through said vertical pipe, whereby said first scrubbing liquid stream is discharged from the lower end of said vertical pipe onto the apex of said conical baffle and passes downwards on the outer surface of said conical baffle and is projected outwards and into said gas stream adjacent to the lower end of said conical baffle, an inverted frustoconical baffle, said inverted frustoconical baffle being concentrically disposed external to said conical baffle and spaced away from said conical baffle, whereby a downwardly converging annular venturi gas passage is defined between said inverted frustoconical baffle and said conical baffle, said inverted frustoconical baffle having a lower edge terminating adjacent to the lower end of said conical baffle, fluid closure means extending between the upper end of said inverted frustoconical baffle and said conduit, nozzle means to pass a second scrubbing liquid stream downwards on the inner surface of said inverted frustoconical baffle, whereby said second scrubbing liquid stream is projected inwards and into said gas stream adjacent to the lower end of said conical baffle, means for vertically adjusting said vertical shaft whereby said conical baffle is vertically movable relative to said inverted frustoconical baffle, and means to separate the gas-liquid mixture discharged below said inverted frustoconical baffle into a scrubbed gas stream and a liquid stream containing contaminants derived from said gas stream.

18. The apparatus of claim 17, combined with a second inverted frustoconical baffle, said second inverted frustoconical baffle depending downwards from the lower end of said conical baffle.

19. The apparatus of claim 18, in which said second inverted frustoconical baffle is parallel with the lower portion of the inverted frustoconical baffle which is concentrically disposed external to and spaced away from said conical baffle.

20. The apparatus of claim 17, in which said vertical rod is provided with at least one external fin, said fin extending outwards in the annular space between said vertical rod and said vertical pipe.

21. The apparatus of claim 20, in which said fin is vertically attached to said rod.

22. The apparatus of claim 20, in which said fin is spirally attached to said rod.

23. The apparatus of claim 17, in which said means to pass a second scrubbing liquid stream downwards on the inner surface of said inverted frustoconical baffle comprises at least one liquid outlet nozzle, said nozzle being alined substantially tangential to the inner surface of said inverted frustoconical baffle, together with means to pass said second scrubbing liquid stream to said nozzle.

24. The apparatus of claim 23, in which said nozzle is substantially horizontal.

25. The apparatus of claim 23, in which a plurality of nozzles are provided, said nozzles being spaced apart and alined in tandem on a circular shelf, said shelf being mounted about the upper end of said inverted frustoconical baffle, whereby portions of said second scrubbing liquid stream are discharged from said nozzles onto said shelf and said second scrubbing liquid stream flows in a circular direction over the inner edge of said shelf and onto the inner surface of said inverted frustoconical baffle.

26. The apparatus of claim 17, in which a circular horizontal support plate is provided between said shaft and said conical baffle, said plate extending outwards from said shaft to said conical baffle below the apex of said conical baffle.

27. The apparatus of claim 26, in which said circular horizontal support plate extends outwards from said shaft to the lower end of said conical baffle.

28. The apparatus of claim 17, combined with a lower liquid retention container, said container extending downwards from said inverted frustoconical baffle and being provided with a bottom recess for liquid retention, together with means to remove scrubbed gas and excess contaminant-containing scrubbing liquid from said container.

29. The apparatus of claim 17, in which the lower end of said inverted frustoconical baffle is at a lower elevation than the lower end of said conical baffle.